May 21, 1929.  A. MARCHEV  1,713,909
CLUTCH
Filed April 30, 1926

Inventor
Alfred Marchev
by [signature]
Att'y.

Patented May 21, 1929.

1,713,909

UNITED STATES PATENT OFFICE.

ALFRED MARCHEV, OF LA GRANGE, ILLINOIS, ASSIGNOR TO WESTERN ELECTRIC COMPANY, INCORPORATED, OF NEW YORK, N. Y., A CORPORATION OF NEW YORK.

CLUTCH.

Application filed April 30, 1926. Serial No. 105,696.

This invention relates generally to clutches, and more particularly to automatic locking and releasing clutches.

An object of the invention is to provide an automatic locking and releasing clutch which when placed in operative position will automatically and positively interlock the driving and driven members so long as the load upon the driven member is below a predetermined value, and which when the load exceeds this value will automatically effect a disconnection between the driving and driven members.

In accordance with the general features of the invention, there are provided in one embodiment thereof two coaxially mounted friction disks, the outer of which is provided with a series of annular ratchet teeth. Connected to the inner disk by means of a helical spring is a plate carrying a pivoted pawl which may engage the ratchet teeth but which is normally restrained therefrom by a spring. When the outer disk which is connected to the source of power is moved into contact with the inner disk the latter will be driven by friction until centrifugal force throws the pawl outwardly against the force of the restraining spring into engagement with the ratchet teeth on the outer disk. The inner disk which is connected to the machine to be operated will then be driven at the same rate as the outer disk until the outer disk is manually disengaged or until the machine becomes locked or overloaded, in which event the inner disk lags behind the outer disk and the pawl plate until a pin carried by the inner disk strikes the pawl and releases it from engagement with the ratchet teeth. During the same movement follower pins carried by the pawl plate follow the groove of a cam on the inner plate and are forced outwardly against the outer disk, thereby disengaging the disks and disconnecting the machine from the source of power.

It is believed that the invention will be clearly understood from the following detailed description taken in connection with the accompanying drawings, in which—

It is, of course, to be understood that the above figures are illustrative only and that the invention is not limited to the exact form of apparatus disclosed therein but is subject to any change or modification within the scope of the appended claims.

Figure 1:
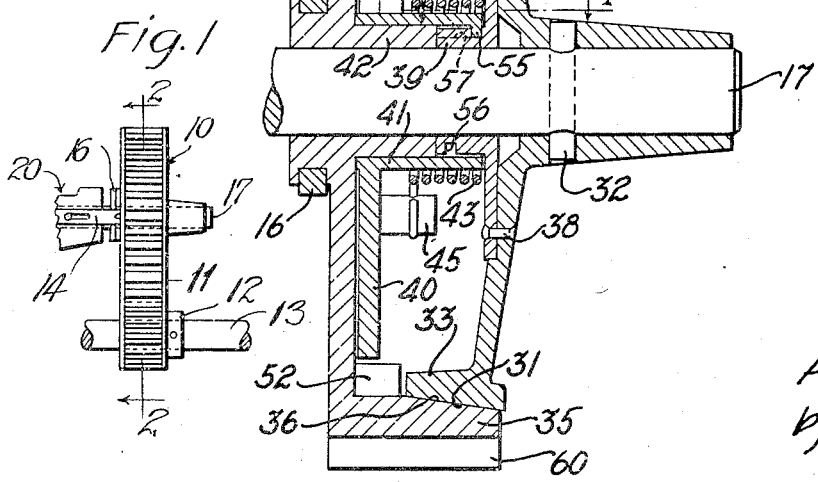
Fig. 1 is a front elevation of applicant's improved clutch.

In the drawings in which like numerals designate like parts throughout the several views, the improved clutch, designated generally by the numeral 10, is shown in Fig. 1 in connection with a part of a machine, of any suitable type designated generally by the numeral 20. A shaft 13 connected to a source of power (not shown) has a sprocket 12 mounted thereon which transmits power from the shaft 13 to a shaft 17 of the machine 20 by means of a chain 11 which coacts with teeth 60 on the clutch 10. The clutch 10 may be shifted into and out of operative engagement by any suitable means, such as a loose fitting sleeve 16 connected to a sliding rod 14 which may be manually operated in any suitable manner.

Figure 2:
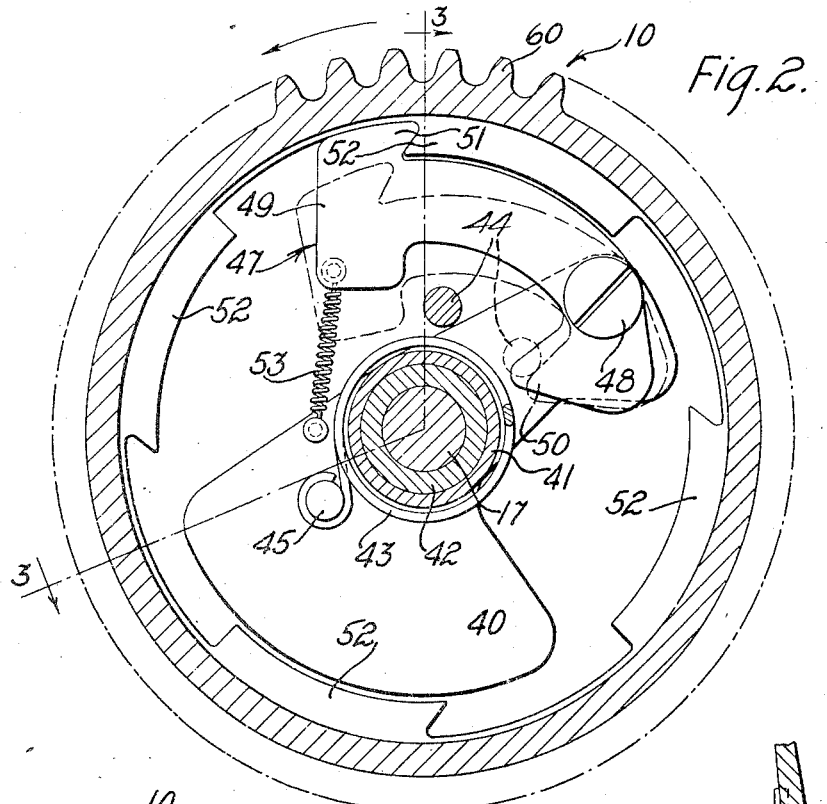
Fig. 2 is an enlarged sectional view of the improved clutch taken substantially on line 2—2 of Fig. 1.
Figure 4:
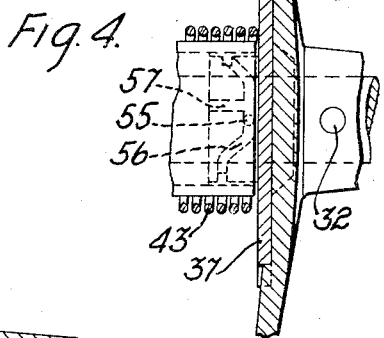
Fig. 4 is a fragmentary sectional view thereof taken substantially on line 4—4 of Fig. 3, showing the disengaging cam.
Figure 3:
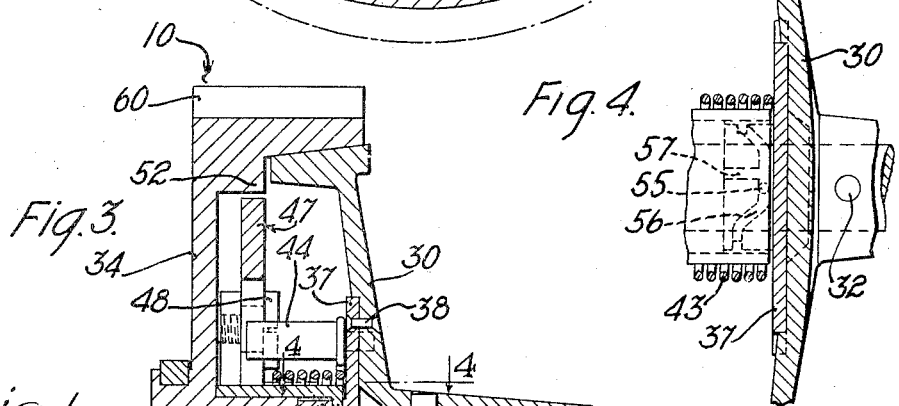
Fig. 3 is a sectional view thereof taken on line 3—3 of Fig. 2.

The clutch 10, as shown in detail in Figs. 2, 3 and 4, consists of a disk 30 connected to the shaft 17 by means of a pin 32, which disk is provided with an annular flange 33 having an outer inclined peripheral friction surface 31. Mounted loosely on the shaft 17 is a disk 34 provided with an annular flange 35 having an inner friction surface 36 adapted to effect a slipping engagement with the surface 31 of the disk 30 when the disk 34 is shifted to the right as shown in Fig. 3. A plate 37 is rigidly secured to the disk 30 by any suitable means, such as rivets 38, which plate is provided with a hub 39 fitting around the shaft 17. Mounted adjacent the disk 34 is a pawl plate 40 provided with a hub 41 which fits loosely over the hub 39 on the plate 37 and the hub 42 carried by the disk 34. A helical spring 43 is fitted over the sleeve 41 and is secured at one end to a pin 44 carried by the plate 37, and at the opposite end to a pin 45, angularly disposed with respect to the pin 44, carried by the pawl plate 40. The normal position of the pin 44 is as shown in full lines in Fig. 2. A pawl 47 is pivotally mounted to the pawl plate 40 by means of a screw 48, which pawl is provided with a long curved arm 49 and a shorter offset arm 50. The arm 49 is provided with a hook 51 which is adapted to engage with the ratchet teeth 52 formed on the inner side of the disk 34. The pawl 47 is normally restrained in the position shown in dotted lines in Fig. 2 out of engagement with the ratchet teeth 52 by means of the coil spring 53 connected at one end to the pawl 47 and at the other end to the pawl plate 40. The hub 41 on the pawl plate 40 is provided with a pair of diametrically opposite inwardly extending pins 55, which extend into a groove 56 formed in the hub 39 carried by the plate 37, a pair of slots 57 being provided in order that the pins 55 may be inserted.

It is believed that the operation of the improved clutch will be readily understood from the foregoing detailed description and from the following general description of its operation: Assuming that the disk 34 as viewed in Fig. 1 is to the left in its disengaging position and is rotating free of the disk 30, the disk 34 will, of course, turn loosely upon the shaft 17 and the machine 20 will not be operated. Now if the disk 34 is shifted to the right, as shown in Fig. 3, so that the surface 36 comes into engagement with the surface 31 of the disk 30, the latter will first be driven by friction, the frictional contact being such, however, that the disk 30 lags behind the disk 34 on account of the normal slippage between the friction surfaces as previously described. The pawl plate 40 will be driven by the inner disk 30 through the helical spring 43 which has one end fastened to the pin 44 carried by the disk 30 and the other end attached to the pin 45 secured to the pawl plate 40 until the centrifugal force becomes great enough to overcome the force of the spring 53 which restrains the pawl 47 when the latter will be thrown outwardly from the position shown in dotted lines in Fig. 2 to the full line position and into engagement with the ratchet teeth on the disk 34. The disk 30 will then be driven through the helical spring 43 at the same rate as the outer disk until the outer disk is manually shifted outwardly or until the machine 20 becomes locked or overloaded. In either of the latter events, the disk 30 tends to lag behind the disk 34 and the pawl plate 40 against the force of the helical spring 43, since the frictional engagement between the surfaces 31 and 36 is not of itself sufficient to drive the disk 30 at the same speed as the disk 34. When the load on the machine 20 reaches a certain maximum value which is predetermined by the strength of the helical spring 43 there will be an angular displacement between the disk 30 and the pawl plate 40. When this displacement takes place the pin 44 will assume the position shown in dotted lines in Fig. 2, will press against the arm 50 of the pawl 47 and disengage the latter from the ratchet teeth 52. At the same time the pins 55 carried by the hub 41 on the pawl plate 40 follow along the cam groove 56 in the sleeve 39 and are forced thereby to the left as seen in Fig. 3, while they in turn force the pawl plate 40 against the disk 34, thereby forcing the latter out of frictional engagement with the disk 30 and consequently disengaging the driving and driven members of the clutch whereby the operation of the machine ceases.

What is claimed is:

1. In a clutch mechanism, a driving member provided with a friction surface, a driven member provided with a friction surface adapted to make a slipping engagement with the first mentioned surface, means yieldingly connected to the driven member for making a positive connection between the members, and means responsive to an overload condition for disengaging the positive connection.

2. In a clutch mechanism, a driving member provided with ratchet teeth and a friction surface, a driven member having a friction surface adapted to make a slipping engagement with the first mentioned surface, a member yieldingly connected to the driven member provided with a pawl for operatively engaging the ratchet teeth, and means responsive to the load for disengaging the pawl from the ratchet teeth and for effecting a separation of the frictional surfaces.

3. In a clutch mechanism, a driving member provided with a flange carrying a series of ratchet teeth and a friction surface, a driven member provided with a flange carrying a friction surface adapted to make a slipping engagement with the first mentioned surface, a pawl plate adjacent the driving member yieldingly connected to the driven member, a pivoted pawl carried by the pawl plate adapted to engage the ratchet teeth, and means responsive to the load for disengaging the pawl from the ratchet teeth.

4. In a clutch mechanism, a driving member, a driven member, means for effecting a slipping engagement between the members, means for positively connecting the members, and means responsive to the load for releasing the first mentioned means and for disconnecting the second mentioned means simultaneously.

5. In a clutch mechanism, a driving member having a friction surface, a driven member having a friction surface, means for effecting a slipping engagement between the friction surfaces, means for positively connecting the members, means responsive to the load and said slipping movement between the friction surfaces for releasing the first mentioned means, and means responsive to the load for disconnecting the second mentioned means.

6. In a clutch mechanism, a shaft, a friction member fixedly mounted on the shaft, a friction member loosely mounted on the shaft and adapted to be shifted along the shaft into sliding engagement with the first mentioned member, means connecting the second mentioned member to a source of power, means to shift the second mentioned member into engagement with the first mentioned member, means connected to the second mentioned member for positively connecting the members together, and means responsive to the load for disengaging the members.

7. In a clutch mechanism, a driving member provided with a flange carrying a series of ratchet teeth and an inner friction surface, a driven member provided with a flange carrying a peripheral friction surface adapted to make a slipping engagement with the first mentioned surface, a pawl plate interposed between the members adjacent the driving member, a helical spring connecting the pawl plate to the driven member, a pivoted pawl carried by the pawl plate provided at one end with a hook adapted to engage the ratchet teeth and at the other end with an offset arm, and a pin carried by the driven member which when the driven member is overloaded will strike the offset arm of the pawl and release it from engagement with the ratchet teeth.

8. In a clutch mechanism, a driving member provided with a flange carrying a series of ratchet teeth and an inner friction surface, a driven member provided with a flange carrying a peripheral friction surface adapted to make a slipping engagement with the first mentioned surface, a cylindrical cam carried by the driven member, a pawl plate adjacent the driving member, a helical spring connecting the pawl plate and the driven member, a pivoted pawl carried by the pawl plate provided at one end with a hook adapted to engage the ratchet teeth and at the other end with an offset arm, a pin carried by the pawl plate adapted to cooperate with the cylindrical cam, a pin carried by the driven member adapted to engage the offset arm of the pawl whereby when the driven member is overloaded the pin carried by the driven member releases the pawl and the pin carried by the pawl plate is operated by the cam to force the friction surfaces out of engagement.

9. In a clutch mechanism, a driving member, a driven member, means for effecting a slipping engagement between the members, means for positively connecting the members, a cam carried by the driven member, means operated by the cam for releasing the first mentioned means, and means for disconnecting the second mentioned means, said releasing means and disconnecting means acting when the load upon the driven member reaches a predetermined value.

10. In a clutch mechanism, a driving member, a driven member provided with a cam, means for effecting a slipping engagement between the members, means for positively connecting the members, means adjacent the driving member provided with a pin adapted to cooperate with the cam to release the first mentioned means, and means for disconnecting the second mentioned means, said releasing means and disconnecting means acting when the load upon the driven member reaches a predetermined value.

In witness whereof, I hereunto subscribe my name this 24th day of April, A. D. 1926.

ALFRED MARCHEV.